Figure 1:
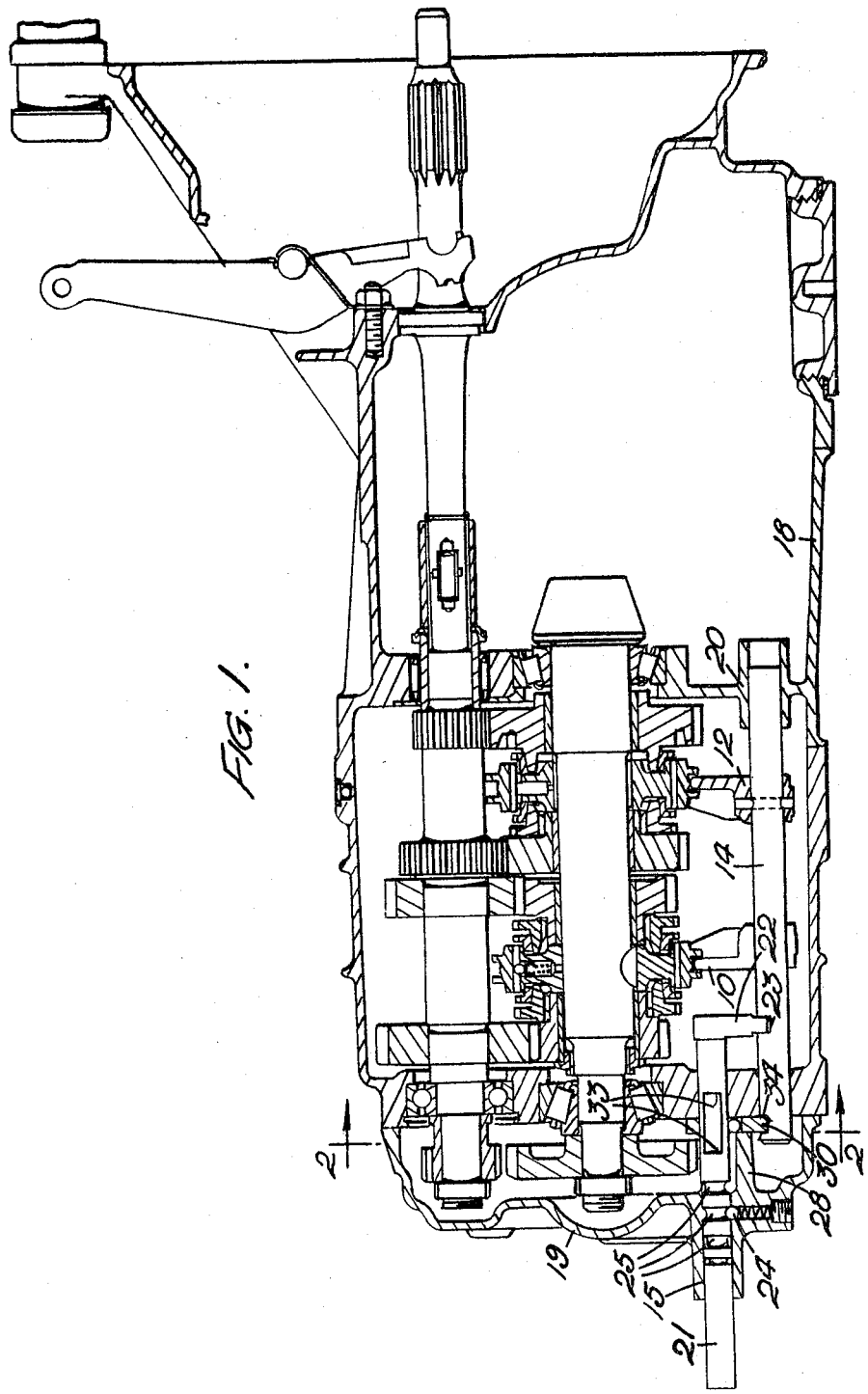

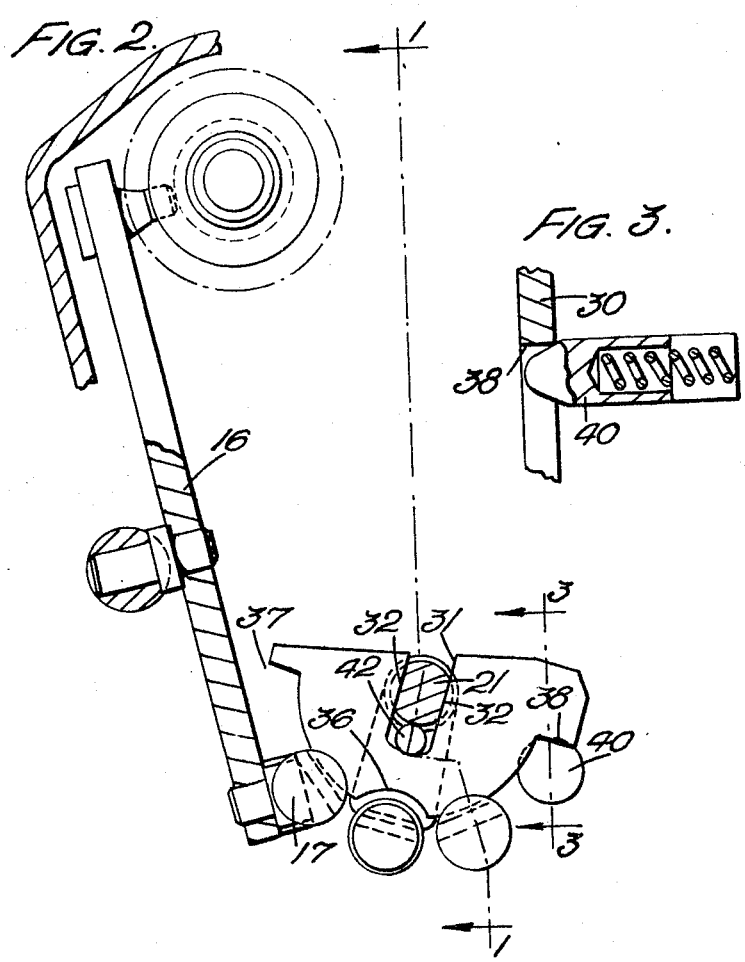

3,283,601
CHANGE-SPEED GEAR MECHANISMS
Adrian William West and John Lewis, Coventry, England, assignors to Humber Limited, Coventry, England, a British company
Filed Apr. 24, 1964, Ser. No. 362,333
10 Claims. (Cl. 74—335)

The invention relates to change-speed gear mechanisms.

The invention provides, in a change-speed gear mechanism of the kind having at least two parallel gear selector rods mounted for sliding movement, means on the rods to effect engagement of selected gear ratios, on each rod a socket which is aligned transversely of the rods with the sockets of the other rods when the rods are in a neutral position, a selector shaft parallel to the rods, and a gear selector arm mounted on the selector shaft, the shaft being mounted for rotation about its axis to engage the arm with any one of the sockets when they are aligned, and for axial sliding movement to effect gear ratio engaging and disengaging sliding movement, through the engagement of the rod and socket, of the selected rod; a locking device for the rods consisting of a set of notches, one on each selector rod, providing pairs of abutment faces which notches are also transversely aligned when the selector rods are in the neutral position aforesaid, a locking member having an edge portion arranged to engage in the notches other than the notch of the rod which, for the time being, is engaged by the arm and selected for movement, means to rotate the locking member with the selector shaft to change the notches it engages in synchronism with movement of the arm to change the socket engaged thereby and means to hold the locking member against sliding movement with the shaft whereby each rod, other than that selected, is locked against sliding movement by engagement of the abutment faces with the locking member.

In one form of the invention the rods are substantially equi-distant from the shaft and the locking member is in the form of a sector of a circle centered on and perpendicular to the selector shaft with its arcuate edge engaging in the notches in the rods and cut away at a position in angular registration with the arm to provide for disengagement of the sector from the notch in each rod in turn, as the sector and arm are rotated by the shaft.

Preferably the locking member has abutments which engage stops at the ends of the rotational movement, to limit such movement. Conveniently the rods themselves provide such stops.

It is also preferred that the selector shaft has steps or other abutments which engage the locking member at the ends of the sliding movements of the shaft to limit such movements. For example, the shaft and the locking member may have engaging parts of non-circular configuration whereby rotation of the shaft effects rotation of the member and the parts of non-circular configuration of the shaft may end in steps as aforesaid.

In one construction according to the invention, the locking member is forked to embrace the shaft, the bottom of the fork, when assembled on the shaft, has substantial clearance from the shaft, thereby providing for movement of the member towards the shaft to permit disengagement of the member from the notches in the rods when dismantling, and to prevent such movement in use there is included a removable distance piece (e.g. a steel ball) between the bottom of the fork and the shaft.

It is preferred to hold the locking plate between two separable parts of a box or casing for the mechanism which prevent movement of the plate in the lengthwise distance of the shaft and rods.

There may be included in the mechanism a resilient stop or detent engageable by the locking member to offer resistance to movement thereof and of the gear lever or other control member to positions in which a reverse gear ratio is engaged. There may also be a resilient detent engaging the selector shaft to hold it in its neutral and gear-engaged positions.

A specific example of a gear mechanism according to the invention will now be described with reference to the accompanying drawings in which:

FIGURE 1 is a sectional view of a gear box showing the relevant parts of the mechanism, the view being on the line 1—1 in FIGURE 2, FIGURE 2 is an enlarged scrap view in the direction 2—2 in FIGURE 1, and FIGURE 3 is a scrap section, on the line 3—3 in FIGURE 2, showing a detail.

The gear mechanism forming the subject of this example is intended for use in a rear engine driven motor car and to provide four forward ratios and a reverse. The input and output shafts are side by side and the output shaft carries a bevel gear by which it is directly coupled to a differential gear. The four forward ratios have constant mesh gears engageable to drive by means of dog clutches on the driven shaft. The dog clutches are associated with synchro-mesh devices and are moved into and out of engagement by two selector forks of which one, shown at 10, is fixed to a selector rod 11. This fork is moved by sliding rod 11 to the right (as seen in FIGURE 1) to engage the third ratio and by moving the rod to the left to engage the top or fourth ratio. The other fork, positioned at 12, is fixed to a selector rod 14 and is movable thereby to the right to engage the first ratio and to the left to engage the second ratio. The reverse gear is engageable by means of a rocking lever 16, to which rocking movement is given by sliding a selector rod 17.

The mechanism is contained in a housing which comprises a body part 18, an end cover 19 and a part which provides guides 20 for the rods 11, 14 and 17. This part also divides the gear box from the differential gear which is not shown. The lever 16 is contained within part 19.

The part 19 provides a guideway 15 for a selector shaft 21 to which sliding and part rotational movements may be given by means of a gear lever inside the motor car body. The shaft 21 carries a selector arm 22 which is selectively engageable, by rotation of shaft 21, in any one of a set of notches 23 in the rods, these notches being in alignment, transversely of the rods, when the rods are in their neutral position. The rods are equi-distant from the shaft 21. Rotational movement of shaft 21 when in the neutral position shown and when the notches 23 are in line, therefore moves the arm from one notch to another and enables a selection of the rods to be made. Lengthwise movement of the shaft then imparts lengthwise ratio engaging movement of the selected rod. A single spring and ball detent 24 is provided in the guideway 15 and is engageable in grooves 25 in shaft 21 to retain the shaft in its gear-engaged and neutral positions.

Held between the end wall of the casing part 18 and a rib 28 on the part 19 is a locking plate 30 of substantially semi-circular form. The plate has a fork or notch 31 which closely embraces two opposed flats 32 on shaft 21 so that rotation of the shaft rocks the plate but the shaft is free to move, to an extent limited by the engagement of steps 33 with the plate, in the lengthwise direction. The arcuate periphery of the plate engages in notches 34 in the three rods 11, 14 and 17, these notches being aligned when the notches 23 are in line. The plate prevents sliding movement of the rods so engaged. The plate has however a cut-away portion 36 which is in registration with the arm 22, as seen in FIGURE 2, and such that the plate is clear of the notch in that rod which is, for the time being, engaged by the arm, whereby that rod is free for movement and the other two are locked. The plate has abutments 37, 38 which are engageable with rods 17 and 11 to limit the rotational movements of the plate and shaft. In addition there is a spring urged detent plunger 40 held in part 18 which resists movement of the plate 30 to the position in which the reverse rod is movable and engaged by arm 22.

In order to permit assembly of the plate 30 on the shaft 21 and in the notches 34 and dismantling therefrom, the bottom of the fork 31 has substantial clearance from the shaft. After assembly this clearance is taken up by a ball 42 inserted into the fork.

The invention is not restricted to the details of the above example. For instance the detent 24 may be replaced by three detents of similar construction but co-operating with grooves in the three selector rods respectively.

We claim:

1. In a change-speed gear mechanism of the kind having at least two parallel gear selector rods mounted for sliding movement, means on the rods to effect engagement of selected gear ratios, on each rod a socket which is aligned transversely of the rods with the sockets of the other rods when the rods are in a neutral position, a selector shaft parallel to the rods and a gear selector arm mounted on the selector shaft, the shaft being mounted for rotation about its axis to engage the arm with any one of the sockets when they are aligned, and for axial sliding movement to effect gear ratio engaging and disengaging sliding movement, through the engagement of the rod and socket, of the selected rod; a locking device for the rods consisting of a set of notches, one on each selector rod, providing pairs of abutment faces which notches are also transversely aligned when the selector rods are in the neutral position aforesaid, a locking member having an edge portion arranged to engage in the notches other than the notch of the rod which, for the time being, is engaged by the arm and selected for movement, means to rotate the locking member with the selector shaft to change the notch it engages in synchronism with movement of the arm to change the socket engaged thereby and means to hold the locking member against sliding movement with the shaft whereby each rod, other than that selected, is locked against sliding movement by engagement of the abutment faces with the locking member.

2. A change-speed gear mechanism as claimed in claim 1 in which the rods are substantially equi-distant from the shaft and the locking member is in the form of a sector of a circle centered on and perpendicular to the selector shaft with its arcuate edge engaging in the notches in the rods and cut away at a position in angular registration with the arm to provide for disengagement of the sector from the notch in each rod in turn, as the sector and arm are rotated by the shaft.

3. A change-speed gear mechanism as claimed in claim 1 in which there is resilient detent means which engages the selector shaft to hold it, against axial movement, in its neutral and gear-engaged positions.

4. A change-speed gear mechanism as claimed in claim 1 in which the locking member has abutments which engage stops at the ends of the rotational movement, to limit such movement.

5. A change-speed gear mechanism as claimed in claim 1 in which the selector shaft has abutment means which engage the locking member at the ends of the sliding movements of the shaft to limit such movements.

6. A change-speed gear mechanism as claimed in claim 5 in which there are engaging parts on the shaft and the locking member which parts are of non-circular configuration whereby rotation of the shaft effects rotation of the member, and the engaging parts end in abutment means as aforesaid.

7. A change-speed gear mechanism as claimed in claim 1 in which the locking member is forked to embrace the shaft, the bottom of the fork, when assembled on the shaft, has substantial clearance from the shaft, thereby providing for movement of the member towards the shaft to permit disengagement of the member from the notches in the rods when dismantling, and to prevent such movement in use there is included a removable distance piece between the bottom of the fork and the shaft.

8. A change-speed gear mechanism as claimed in claim 1 in which the locking plate is held between two separable parts of a casing for the mechanism which prevent movement of the plate in the lengthwise distance of the shaft and rods.

9. A change-speed gear mechanism as claimed in claim 1 in which there is included in the mechanism resilient stop means engageable by the locking member to offer resistance to movement thereof to positions in which a reverse gear ratio is engaged.

10. A gear change mechanism having
 (a) a gear selector shaft,
 (b) at least two parallel gear selector rods mounted for sliding movement, the rods each being substantially equi-distant from the shaft,
 (c) means on the rods to effect engagement of selected gear ratios,
 (d) on each rod a socket which is aligned transversely of the rods when the rods are in a neutral position,
 (e) a gear selector arm mounted on the selector shaft,
 (f) mounting means for the selector shaft arranged so that the shaft is rotatable about its axis to engage the arm with any one of the sockets, when they are aligned, and is capable of axial sliding movement to effect gear ratio engaging and disengaging sliding movement, through the engagement of the rod and socket, of the selected rod,
 (g) a set of notches, one on each selector rod, providing pairs of abutment faces which notches are transversely aligned when the selector rods are in the neutral position aforesaid,
 (h) a locking member on the shaft in the form of a sector of a circle centered on and perpendicular to the selector shaft with its arcuate edge engaging in the notches in the rods and cut away at a position in angular registration with the arm to provide for disengagement of the sector from the notch in each rod in turn, as the sector and arm are rotated by the shaft,
 (i) engaging parts on the shaft and the locking member which parts are of non-circular configuration whereby rotation of the shaft effects rotation of the member, but allow of relative sliding movement between the shaft and the member,
 (j) means to hold the locking member against sliding movement with the shaft whereby each rod, other than that selected, is locked against sliding movement by engagement of the abutment faces with the locking member,
 (k) abutment means on the selector shaft, which means engage the locking member at the ends of the sliding movements of the shaft to limit such movements,
 (l) resilient detent means which engages the selector shaft to hold it, against axial movement, in its neutral and gear-engaged positions,
 (m) abutments on the locking member which engage stops at the ends of the rotational movement, to limit such movement,
 (n) resilient stop means engageable by the locking member to offer resistance to movement thereof to positions in which a reverse gear ratio is engaged, (o) the locking member being forked to embrace the shaft, the bottom of the fork, when assembled on the shaft, having substantial clearance from the shaft, thereby providing for movement of the member towards the shaft to permit disengagement of the member from the notches in the rods when dismantling, and a removable distance piece between the bottom of the fork and the shaft to prevent such movement in use.

References Cited by the Examiner

UNITED STATES PATENTS 3,106,851  10/1963  Iuanchich _____ 74—335

FOREIGN PATENTS 948,509  2/1964  Great Britain.

DAVID J. WILLIAMOWSKY, *Primary Examiner.*

H. S. LAYTON, *Assistant Examiner.*